United States Patent [19]
Beissner

[11] Patent Number: 6,023,807
[45] Date of Patent: Feb. 15, 2000

[54] DRIVING UNIT FOR CLEANING ACCESSORY

[76] Inventor: Hans-Wilhelm Beissner, Speersort 175a, D-21723 Hollern, Germany

[21] Appl. No.: 08/945,364
[22] PCT Filed: Apr. 18, 1995
[86] PCT No.: PCT/DE95/00532
  § 371 Date: Oct. 15, 1997
  § 102(e) Date: Oct. 15, 1997
[87] PCT Pub. No.: WO95/28237
  PCT Pub. Date: Oct. 26, 1995

[30] Foreign Application Priority Data

Apr. 15, 1994 [DE] Germany ............................ 44 13 036
Sep. 14, 1994 [DE] Germany ........................ 94 14 907 U

[51] Int. Cl.[7] ............................. A46B 9/10; A46B 13/02
[52] U.S. Cl. ............................................ 15/88; 15/104.04
[58] Field of Search .............................. 15/77, 88, 104.04

[56] References Cited

U.S. PATENT DOCUMENTS

| | | | |
|---|---|---|---|
| 3,495,288 | 2/1970 | Ford ............................................. | 15/88 |
| 3,916,469 | 11/1975 | Anthem et al. .............................. | 15/88 |
| 3,988,798 | 11/1976 | Kratt .......................................... | 15/88 |
| 4,014,062 | 3/1977 | Scott et al. .................................. | 15/88 |
| 4,205,407 | 6/1980 | King et al. .................................. | 15/88 |

FOREIGN PATENT DOCUMENTS

WO 95/07151  3/1995  WIPO .

*Primary Examiner*—Terrence R. Till
*Attorney, Agent, or Firm*—Duane, Morris & Heckscher LLP

[57] ABSTRACT

A cleaning device with adjustable brush bars that are mounted in a cylindrical inner tube and that may be adjusted inwards or outwards in the radial direction by means of an outer tubular piece. A driving unit for such a cleaning device has an open bore in both axial directions and may be flanged on the cleaning accessory. As the cleaning device is axially open in both directions and the cleaning accessory is also axially open in both directions, elongated threads or bolts may be cleaned easily and without effort. The non-cleaned bolt section lies in front of the cleaning accessory and enters therein, the cleaned bolt section projects out of the axially open end of the driving unit. This not only makes it possible to clean elongated bolts and threads in a reliable manner, it also allows forces to be transmitted in a highly effective manner to the brush cleaning accessory, independently from the length of the thread to be cleaned. The force may be increased by stepping down the rotary driving member. A restoring spring device allows the brush bars to be independently pressed in the radial direction against the setting cam and the brushes to be held in the set position.

18 Claims, 5 Drawing Sheets

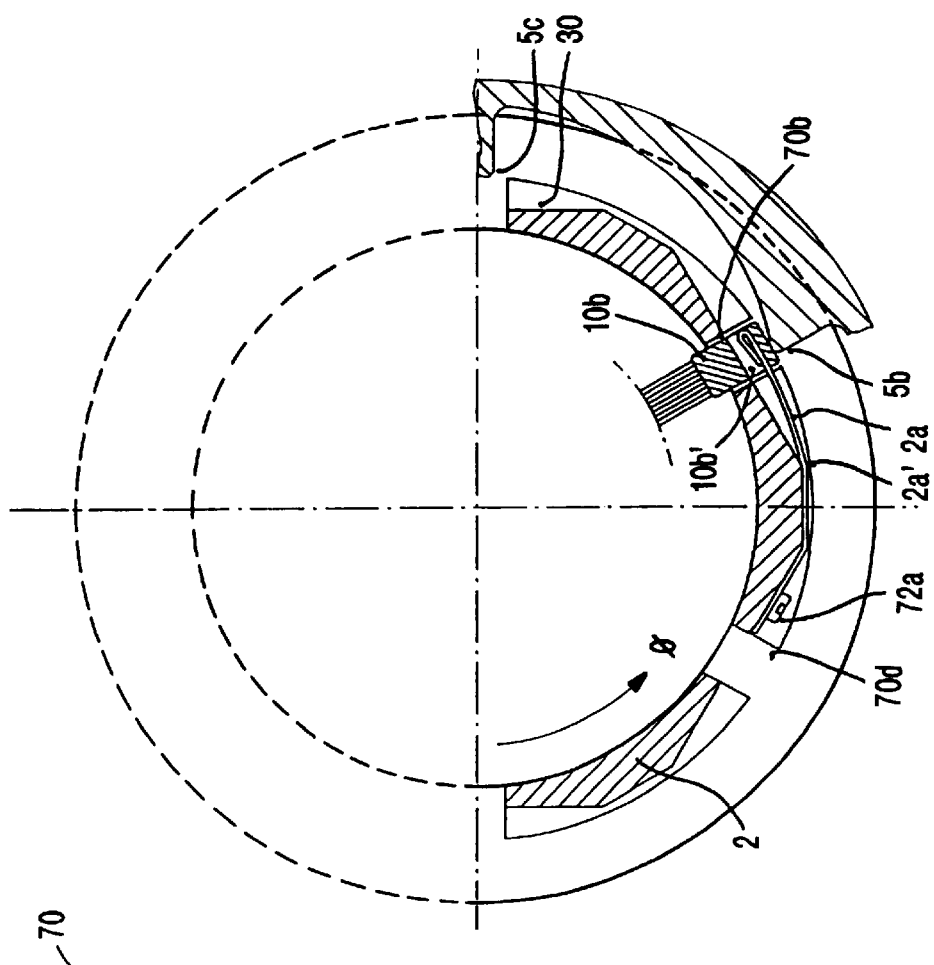
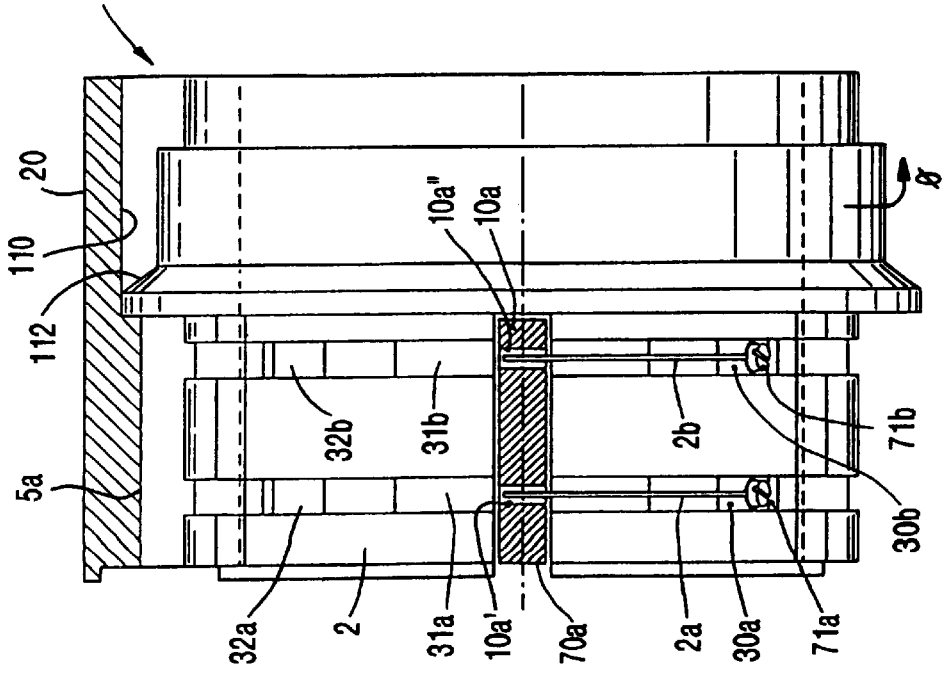
FIG. 1C
FIG. 1D

DRIVING UNIT FOR CLEANING ACCESSORY

BACKGROUND OF THE INVENTION

1. Field of the Invention

The invention relates to a drive unit for a bolt-cleaning device or a thread-cleaning device. A possible thread-cleaning device which operates with radially movable brush bars and which consists of two concentric tubular pieces which can be moved circumferentially relative to each other is described in DE-U 93 13 722.2 which was made available to the public on Nov. 25, 1993. The radial displacement is accomplished with circumferentially distributed setting cams on one of the tubular pieces.

2. Description of the Related Art

The cleaning device disclosed in DE-U 93 13 722.2 has a drive mechanism on the rearward end segment of the above-mentioned concentric cylindrical piece which is provided with a central drive pin 1. The central drive pin 1 is firmly connected to the inner tubular piece 2 and therefore rotates the two concentric tubular pieces (inner sleeve 2 and outer sleeve 4) around the threaded bolt to be cleaned. The length of the tubular piece determines the maximum length of the thread to be cleaned.

The invention is intended to provide help here and assigns itself the task of expanding the scope of application of the cleaning attachment and also of devising the driving principle for it, so that other—exchangeable—cleaning devices may be used.

SUMMARY OF THE INVENTION

This is accomplished by the invention having fundamental features including a drive unit with a drive motor arranged offset on the side relative to the axis of the bolt to be cleaned which drives a cylindrical coupling ring via a rotary drive member. The coupling ring is open on both sides (axially) and displays a flanging-on region on one side through which the above-mentioned (or a differently designed, preferably open on both sides) cleaning device can be mounted non-rotatably as a cleaning attachment.

If the drive motor, which may be a pneumatic motor or an electrically powered motor, is moved sideways relative to the central or cleaning axis of the coupling ring and cleaning attachment and securely mounted on a device body then the important result is obtained that the cleaning attachment and drive unit are open axially in both directions. Very long threads and bolts can thus be conveniently cleaned due to the fact that the bolt enters on one side of the cleaning device, passes through it and emerges again on the other side where the drive unit is flanged on but offset to the side. In this way it is possible to observe the cleaning process; both the threaded segment having passed through (cleaned) and also the threaded segment entering (to be cleaned) are in plain view.

By offsetting the drive axis relative to the cleaning axis the principle is created that the transmission of forces to and application of force by the brush bars are always close together—even in the case of very long threading. In addition, due to the possibility of stepping down the rotation speed of the drive pinion (on the motor shaft) to the rotation speed of the cylindrical coupling ring the cleaning power is clearly increased. For this purpose the diameters of the pinion and coupling ring are distinctly different.

The power of the motor is transmitted to the cleaning attachment via the slip-proof rotary drive member and the coupling ring; it is rotatable mounted in the device body of the unit, for which, e.g., three circumferentially distributed rotary bearings are used whose bearing axis is parallel but offset to the side from the cleaning axis. The points of attack of the bearings engage circumferential grooves on the coupling ring so that an axial guidance is achieved.

The coupling ring has a flanging-on region in the axial direction on which the cleaning attachment is non-rotatably mounted. The rotation-proof mounting may be detachable so that the drive unit can also be used for other cleaning attachments or removed, maintained and cleaned by itself.

Even if the drive is only running slowly in order to apply high cleaning force the brush bars being displaced by the initially mentioned setting cam during the radially outward motion can be guided automatically into their retracted positions in which they lie against the setting cam if spring-loaded pins are used. The extended springs in the form of leaves, rods, or wire are affixed on the outer circumference of the brush holder (cylinder). Their free ends extend into cross openings on the brush bars which are guided in slots or axial cuts formed in the inner body so that the brush bars are capable of moving radially. The farther the brush bars are pushed in, the more strongly the free end of the spring pin acts on them to force them out. This pre-tension gives them a secure positioning on the setting cams even if the rotation speed is low.

Simple assembly, reliable pre-tension and a low risk of injury distinguish this variant. Because the brush bars must frequently be changed, only a small risk of injury exists because of a loop-shaped free end. The brush bars are ejected radially—e.g., with a screwdriver, the extended spring pins release them and snap (spring) back easily to their rest position.

The spring pins do not come into contact with the setting cams, and even when the adjustment cylinder is released (which lies around the outer wall of the brush carrier), remain firmly connected to the brush carrier and precisely positioned.

The grooves in which the spring pins are affixed may be designed as segments of a chord, a chord segment in each case lying symmetrically to the setting opening in each case in which the brush bar is guided. Between two chord segments arranged side by side or in succession a short piece of the original outer diameter of the brush carrier may remain in the axial or radial direction. This results in better guidance of the brush bars in the vertical direction in each case (axially→radially; radially→axially).

The free end can be designed in such a way that in the driven-in state the ends of the spring projections come to lie on the chord-shaped groove segment. With this a barrier is formed so that the brushes can neither fall inward nor (because of their spring action) outward. In the state of rest the free end of the spring pins extends into the rearward segment of the cross openings of the brushes, especially the last half.

In order to be able to make the coupling of the cleaning attachment and coupling ring stable and non-rotatable a pot-shaped (in cross section U-shaped) reducing segment of the cleaning attachment can be coordinated with the cylindrical flanging-on region.

In order to achieve a circumferentially readjustable mounting of the coupling ring, one of the bearing points is designed to swivel in the plane in which the rotary drive member rotates. A favorable possibility for adjustment arises when the circumferential bearing is designed to be movable by a cam which is arranged at a point on the main body having the greatest distance from the drive motor. From this position—toward the drive motor—a bearing force acting in the above-mentioned plane may be exerted which acts against two other circumferential bearings dose to the drive motor. The coupling ring is also pressed on this bearing by the circumferential force of the rotary drive member which is driven in rotation by the motor. It runs on the outer circumference of the coupling ring and—viewed in the axial direction—between the bearing positions acting on both sides (above and below) of the circumferential rotary bearing.

The bearing mount acts as a roller bearing which supports the barrel-shaped inner part (coupling ring) securely, free of play and adjustably on the main body of the drive unit. The unilaterally acting tensile forces of the motor via the chain on the coupling ring can be safely absorbed by the bearings.

With this configuration of a described drive unit for an exchangeable cleaning attachment greater forces can be applied more directly. The greater forces are based on the short axial distance from the drive member and cleaning brushes having a braking action according to the invention. At low rotation speed the cleaning brushes may be pre-tensioned via spring pins into their retracted position even if the centrifugal force is not sufficient for this.

It is possible to clean very long threads. However, it is also possible to clean short thread segments that lie far down on an otherwise very long bolt. The risk of tilting is avoided, because the above-mentioned axial distance between the circumferential application of force and the circumferential braking force is very short, and in addition the possibility exists that the drive unit can be held and guided from two or more sides.

For this purpose one can use handles which extend laterally away from the main body. The right/left run and the raising and lowering to/from the thread is favored by manual guidance and can be initiated by switching on the handle (direction of rotation of the motor). In addition, the motor is switched off (safety cut-off switch) when the handle(s) is/are released.

The diameter of the bolts or thread to be cleaned can be considerably increased and simultaneously a larger region covered if different cleaning devices can be interchangeably mounted on the same drive unit. The drive mechanism can be used both on portable and also on stationary cleaning devices.

In practical operation bolt or thread diameters of 20 to 200 mm can be easily cleaned.

BRIEF DESCRIPTION OF THE DRAWINGS

The invention is explained in detail below with reference to examples of its embodiment.

FIG. 1c is a side elevation of the coupling member 20 and inner body 2, partly in section, showing brush bar 10b in a specific rotational position with respect to the cam surface (brush bar fully extended).

FIG. 1d shows a cross section through the coupling member 20 and inner body 2 with brush bar 10b in a specific rotational position with respect to the cam surface 5b and two axially spaced spring pins 2a, 2b which are singled out as examples, several of which can be distributed over the circumference.

DETAILED DESCRIPTION OF THE PREFERRED EMBODIMENTS

Figure 1:
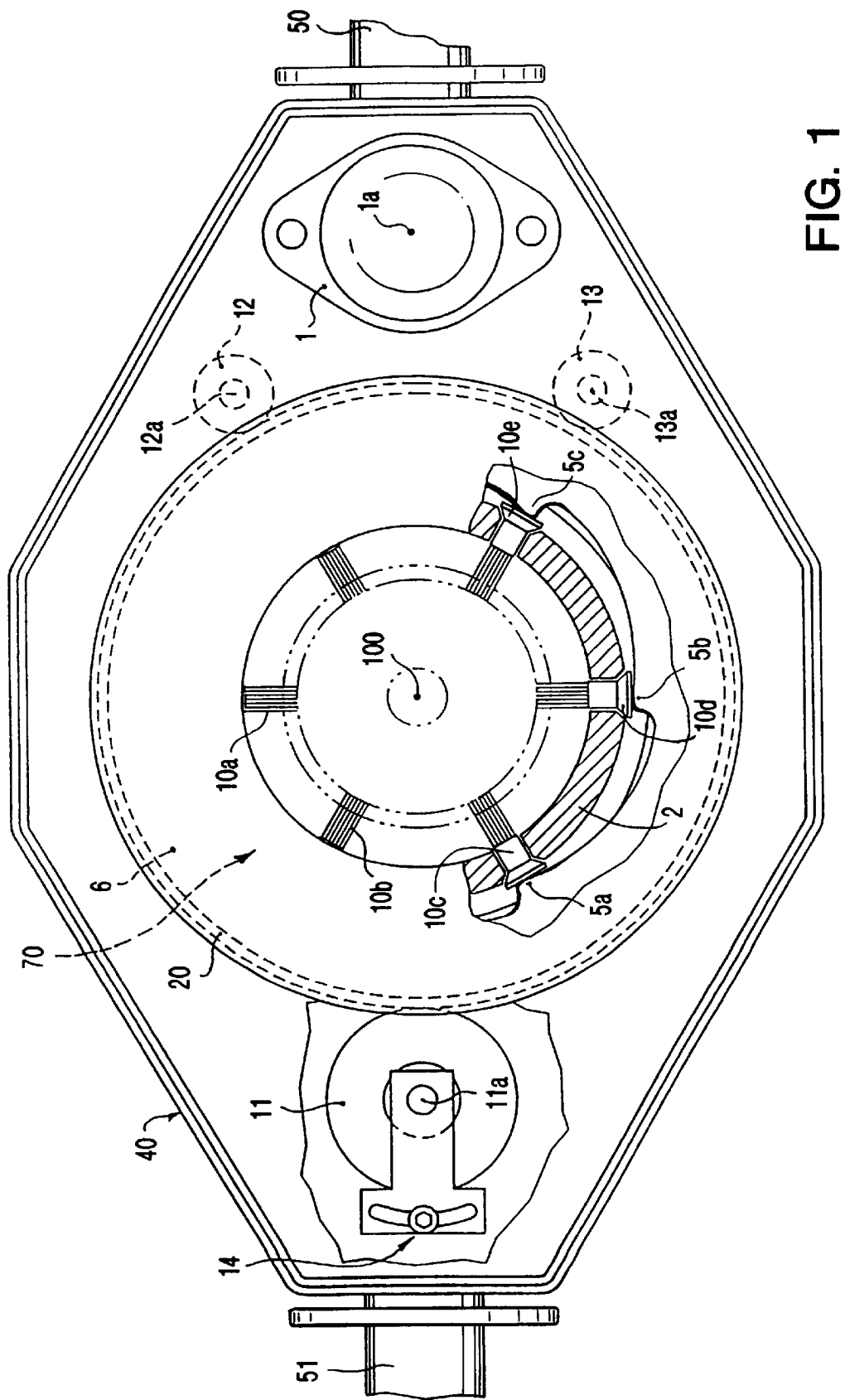
FIG. 1 shows a top view of a drive unit as an example with handles 50, 51 on the left and right sides and a central cylindrical coupling member 20 which is mounted rotatably on three rotary bearings 12, 13, 11 (circumferentially).

The drive motor in FIG. 1—the first example of embodiment—is clearly offset laterally with its axis 1a relative to the cleaning axis 100 of the cleaning attachment 70 and the cleaning axis 100 of the drive mechanism with device body 40. The device body may be designed as a frame or as a carrier essentially covered on the sides; it has an essentially elliptical shape but may also have the form of a polygon. Two handles 50, 51 are arranged in its longitudinal axis extending to the side on which the drive unit is held and guided. One of the handles may be designed as a turning/switching handle for switching the motor 1 on and off.

Figure 2:
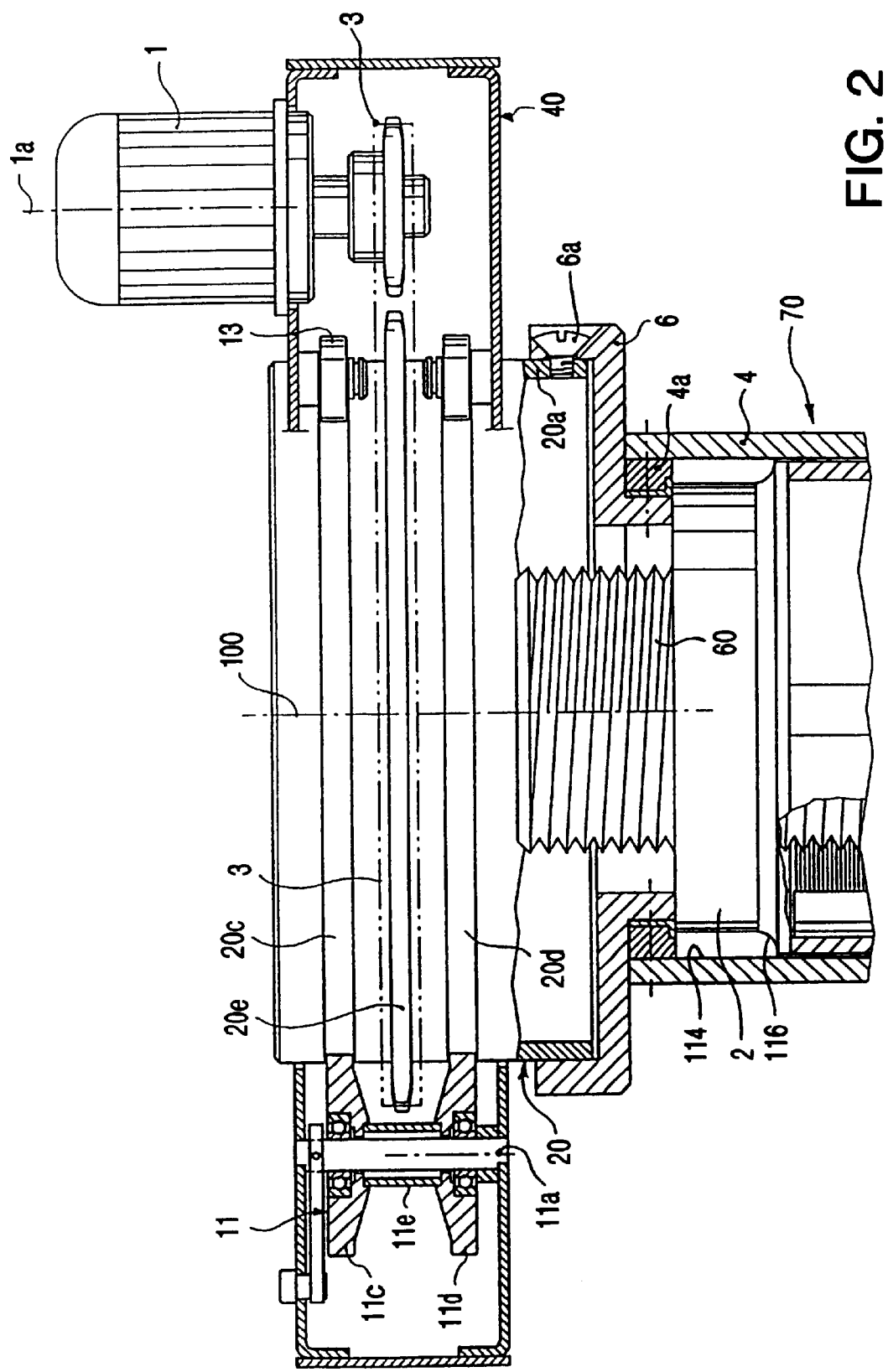
FIG. 2 shows a side view in partially cut-away form of the design shown in FIG. 1 where the drive unit has a device body 40 on which the drive motor 1 is arranged extending upward and offset to the side from the cleaning axis 100.

The motor 1 drives it via a rotary member, a chain or a toothed belt (cf. FIG. 2) which acts circumferentially on a hollow cylindrical coupling member or drive ring 20. For this purpose the coupling member 20 has an outer surface formed with a circumferential toothed ring 20e with teeth for mating with that of the toothed belt or chain 3. The drive motor 1 has a pinion selected to correspond to the translation ratio so that it becomes possible to drive the coupling member 20 in rotation from a lateral drive motor position. Inner body or brush carrier 2 is rotatably coupled coaxially inside the cylindrical coupling member 20. Inner body 2 and coupling member 20 have corresponding outer and inner annular surfaces (110, 112, 114 and 166) for rotatable coupling.

The hollow cylindrical coupling member 20 thus driven in rotation is provided in the axial direction with a flanging-on region 20a on which a reducing flange 6 of the cleaning device in question 70 can be arranged non-rotatably (in the example the fixation screw 6a). The reducing flange 6 in the example of FIG. 2 has a pot shape with a ring region which is adapted in its axial height to the axial length of the flanging-on region 20a of the coupling piece 20.

The reducing flange 6 is provided on each cleaning device 70 that is to be connected to the drive unit; it compensates for the transition from the fixed diameter of the coupling member 20 to the diameter range of the cleaning attachment in question. If the diameters are the same the reducing flange can be omitted.

The bearings 11, 12, 13 recognizable in FIG. 1 in their position in space and shown in their axial structure in FIG.

2 support the coupling tubular piece 20 reliably and at the same time adjustably.

One of the above-mentioned three bearings, provided opposite the drive motor 1 on the device body 40 is designed to be moved by a cam or other suitable adjusting device 14. Its motion is oriented in the plane in which the rotary drive member 3, the chain or the V belt, also revolves. With its adjusting motion in the direction of the motor this circumferential bearing is capable of pressing the drive coupling member 20 against the other two bearings 12, 13 and thus of assuring a stable mounting in this plane.

The adjustment possibility also makes the adjustment of the circumferential bearing support possible which may be required due to wear or strong stress.

The above-mentioned bearings 11, 12, 13 and the drive motor 1 are affixed most favorably to the device body 40 in such a way that the motor 1 with its central shaft 1a, the cleaning axis 100 of the device and the shaft 11a of the opposing bearing 11 are arranged with their points of penetration of the plane of rotation in a straight line. The points lie in the plane of revolution and the line is approximately perpendicular to the cleaning axis 100. The other two guide/pressure bearings 12, 13 which are provided close to the drive motor 1 should be laterally offset to this connecting line.

The bearings 11, 12, 13 may consist of simple roller bearings, but double-ring ball bearings can also be used in which an inner ring is mounted capable of rotating easily relative to an outer ring over the balls lying between them. Such ball bearings are recommended for the upper and lower partial bearings of the bearing 12, 13 near the drive mechanism, but such ball bearings are also recommended for the bearing construction 11 which is adjustable via an eccentric 14 in a plane against the coupling member (drive ring) 20.

In the latter bearing 11 two of these double-ring ball bearings are spaced by a spacing sleeve 11e, and on each of the two ball bearings an essentially disk-shaped reversing pulley 11c, 11d is, affixed which engages the guide grooves 22c, 20d of the coupling member (drive ring) 20 with its outer circumference.

The reversing pulleys 11c, 11d may also be slightly trapezoidal in cross section so that a conical fit in the above-mentioned grooves 20c, 20d of the coupling member (drive ring) 20 is achieved.

The gear ring 20e on the outer circumference of the coupling member (drive ring) 20 is provided approximately in the center between the two outer grooves 20c, 20d; it collaborates with the above-described drive chain or toothed belt 3 which is driven by the motor from the motor side 1, 1a.

The thread 60 to be cleaned is guided along the cleaning axis 100 by the drive 1, 20, 40 and by the cleaning attachment 70.

Figures 1A, 1B:
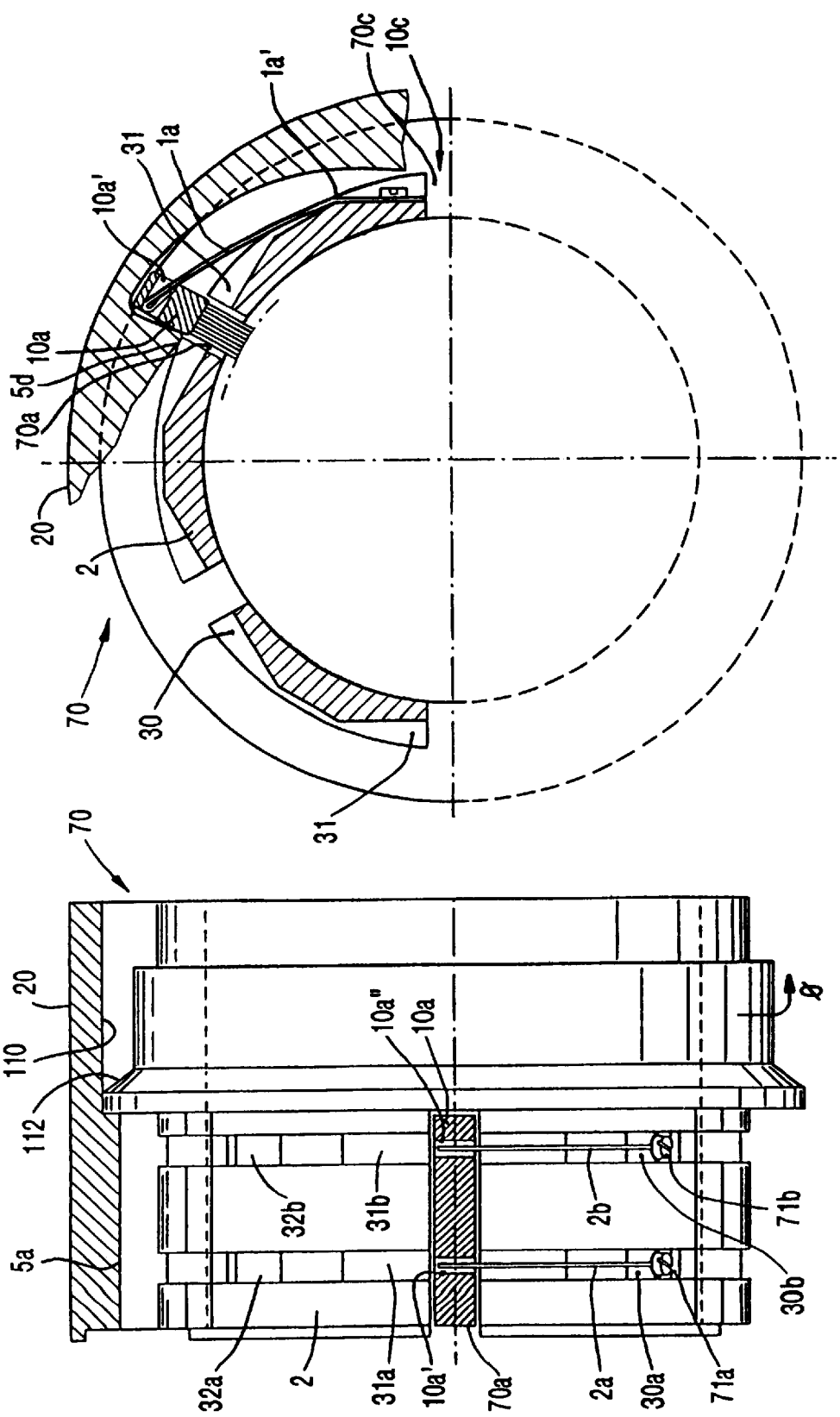
FIG. 1a is a side elevation of the coupling member 20 and inner body 2, partly in section, showing brush bar 10a' in a specific rotational position with respect to the cam surface (brush bar fully retracted).
FIG. 1b is a cross section through the coupling member 20 and inner body 2 with brush bar 10a' in a specific rotational position with respect to the cam surface and two axially spaced spring pins 2a, 2b which are singled out as examples, several of which can be distributed over the circumference.

The brushes 10a, 10b capable of moving in the radial direction with their adjusting cams 5a, 5b, 5c, 5d making adjustments possible arranged on the outer positioning ring 4 are shown in FIG. 1 and 1a. They are distributed around the circumference of the cleaning axis 100.

For details on the construction of a possible cleaning device as an exchangeable attachment and the collaboration between the two cylindrical tubular pieces 4, 20 and their concentric mounting with a ring segment 4a refer to the above cited DE-U 93 13 722.2.

Figure 3:
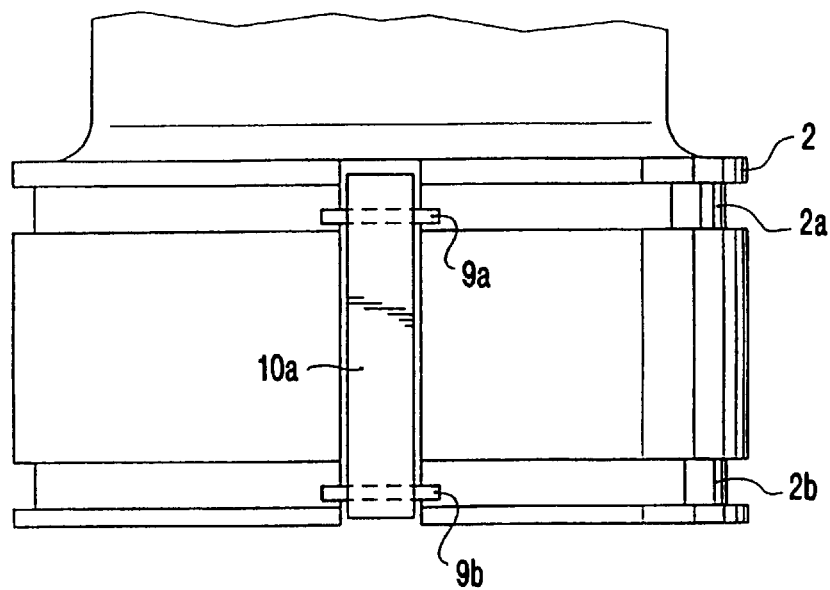
FIG. 3 shows as an example the top view of the cylindrical inner body 2 of a cleaning device 70 with a brush bar 10a mounted in it. The inner body 2 is also recognizable in FIG. 2 at the lower end.
Figure 4:
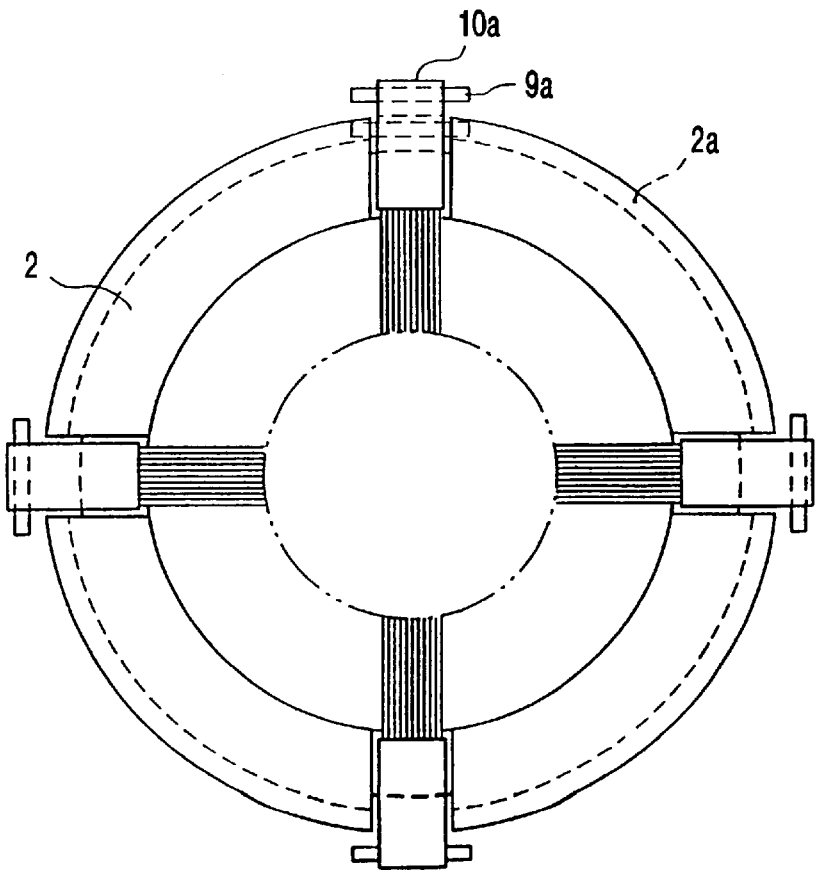
FIG. 4 shows a cross section through the inner body 2 of FIG. 3 in which the shape of the brush bar 10a becomes clear. Also clearly shown is the form of the axial cute cut in the inner body 2 in which the brush bar 10a can move in the radial direction, by engaging adjusting cams 5a, 5b as shown in FIG. 1.

An alternative form of brush bar to the brush bar described there is shown in FIGS. 1a, 1b, 1c and 1d and in FIGS. 3 and 4.

FIGS. 1a, 1b, 1c and 1d illustrate the brush bar retract devices in the form of spring pins which pull the brush bars back automatically and force them radially outward onto the pressing devices or adjusting cams. In each case one pair of the projecting spring pins 1a, 1b is mounted on the inner body 2 spaced out axially. FIG. 1b shows one such pair. Also the chord-shaped grooves 30, 31, 30a, 30b and 31a, 31b may be recognized in which the projecting spring pins are affixed or extend past them with their free ends.

The free end of the projecting spring pins 1a, 1b engages the cross openings 10a', 10a" of the brush bars so that an inward motion of the cleaning brushes is always opposed by a radially outward spring force. If several axially spaced springs are provided good parallel guidance of the brushes 10a results.

The spring force can be increased by bending in the case of a short radial distance. If chord-shaped groove segments 30a, 30b, 31a, 31b, 32a, 32b, . . . are distributed around the circumference in segments, the springs can be affixed at 71a, 71b in the grooves while they lie with their bending point 1a' on the end in question in the transition to a non-grooved circumferential segment of the brush carrier.

The inner body or brush carrier 2 in this example is short axially and has six setting openings 70a, 70b, 70c, 70d for brush bars 10a, 10b, 10c, . . . The number of setting openings varies as a function of the diameter of the brush carrier 2.

The drive mechanism rotates inner body or brush carrier 2 and the spring-mounted brush bars in the rotation direction $\phi$. The radial positioning force of the projecting spring pins is especially advantageous in the case of a low rotation speed of the drive.

An alternative form of brush bars to those described is illustrated in FIGS. 3 and 4. While the brush bars of the state of the art had a cross-sectional form which was somewhat trapezoidal in the upper region, FIGS. 3 and 4 propose and hereby a claim is made for brush bars having an approximately rectangular cross section. The axial fixation and the radial movement possibility are derived from two pins 9a, 9b inserted transversely in its (upper) back part which engage the circumferential outer grooves 2a, 2b. The outer grooves 2a, 2b may be arranged on the front and rear end region of the brush carrier through (the inner cylindrical segment).

More than two cross-running holding pins may also be provided in the back of the brush; then more than two grooves 2a, 2b will be necessary on the outer circumference of the inwardly lying brush carrier of the cleaning attachment.

I claim:

1. A cleaning device for bolts or threads having a cleaning attachment comprising:
    a cylindrical brush carrier having a plurality of axial cuts therein;
    a plurality of brush bars having cross openings, wherein the brush bars axial extend through the axial cuts and are radially displaceable therein;
    a cylindrical coupling member having a cleaning axis and an inner surface formed with a plurality of pressing devices for radially displacing each of the brush bars inwardly through the axial cuts, wherein the cylindrical brush carrier is located coaxially inside the cylindrical coupling member; and
    a plurality of brush bar retracting devices for radially displacing each of the brush bars outwardly through the axial cuts, said brush bar retracting devices having finger-like springs which interact with the brush bars such that an inward motion of the brush bars caused by the pressing devices is constantly opposed by a radially outward spring force.

2. The cleaning device of claim 1, wherein the finger springs are circumferentially elongated.

3. The cleaning device of claim 1, wherein the finger springs are arranged on one side of a cylindrical brush carrier, each of said finger springs having a free end extending tangentially away from said cylindrical brush carrier.

4. The cleaning device of claim 3, wherein said free ends of said finger springs are designed to engage said cross openings of said brush strips.

5. The cleaning device of claim 6, wherein said free ends of said finger springs are positioned radially outside of said axial cuts such that said brush strips are movably insertable into said axial cuts.

6. The cleaning device of claim 3, wherein two or three finger springs are arranged axially close together on said brush carrier.

7. The cleaning device of claim 3, wherein said brush carrier has circumferentially oriented grooves and said finger springs are contactlessly and movably disposed within said grooves.

8. The cleaning device of claim 3, wherein each said finger spring has a bent end secured at an attachment site to each said brush carrier, respectively.

9. The cleaning device of claim 8, wherein the distance between said attachment site of said bent spring end and the neighboring axial cut is small.

10. The cleaning device of claim 9, wherein said grooves have different depths circumferentially in said brush carrier, and are deepest at said attachment sites.

11. The cleaning device of claim 9, wherein each groove consists of a chord-shaped depression with a rectangular cross-section arranged symmetrically to each axial cut.

12. The cleaning device of claim 1, further comprising a slowly rotating drive unit operatively coupled with said cleaning attachment.

13. The cleaning device of claim 12, wherein said drive unit has a drive axis laterally offset from said cleaning axis.

14. The cleaning device of claim 11, wherein said drive motor and said coupling ring are coupled via a slip-proof rotary drive member, said rotary drive member comprising at least one of a chain, a V belt and a toothed belt.

15. The cleaning device of claim 13, wherein the cylindrical coupling member is open axially on both sides and has a cylindrical flanging region on one side for replaceably attaching the coupling ring in a non-rotatable manner.

16. The cleaning device of claim 4, wherein the finger springs have a length which in a relaxed state extends in front of a far edge of said cross opening of said brush bar and when said brush bar is forced radially inward lies close to the far edge.

17. The cleaning device of claim 3, wherein said free end of said finger springs has a loop.

18. The cleaning device of claim 1, wherein said finger springs are made of spring wire.

\* \* \* \* \*